US009871722B2

(12) United States Patent
Ou et al.

(10) Patent No.: US 9,871,722 B2
(45) Date of Patent: Jan. 16, 2018

(54) CONTENT DELIVERY NETWORK ROUTING METHOD, SYSTEM AND USER TERMINAL

(71) Applicant: Huawei Technologies Co., Ltd., Shenzhen (CN)

(72) Inventors: Xiongbing Ou, Beijing (CN); Gunaseelan Lakshminarayanan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 802 days.

(21) Appl. No.: 14/140,928

(22) Filed: Dec. 26, 2013

(65) Prior Publication Data

US 2014/0108672 A1    Apr. 17, 2014

Related U.S. Application Data

(63) Continuation of application No. PCT/CN2011/083398, filed on Dec. 2, 2011.

(51) Int. Cl.
*G06F 15/173*     (2006.01)
*H04L 12/707*    (2013.01)
(Continued)

(52) U.S. Cl.
CPC .......... *H04L 45/22* (2013.01); *H04L 61/1511* (2013.01); *H04L 67/1097* (2013.01)

(58) Field of Classification Search
CPC ............... H04L 29/06; H04L 29/1265; H04L 29/12066; H04L 67/2814; H04L 67/1008;
(Continued)

(56) References Cited

U.S. PATENT DOCUMENTS 7,240,100 B1 *   7/2007   Wein ................... H04L 67/1008
                                                            709/214
7,289,519 B1 *  10/2007   Liskov .............. H04L 29/12066
                                                            370/230
(Continued)

FOREIGN PATENT DOCUMENTS

CN          101197843 A       6/2008
CN          101523379 A       9/2009
(Continued)

*Primary Examiner* — Dustin Nguyen

(74) *Attorney, Agent, or Firm* — Slater Matsil, LLP

(57) ABSTRACT

The present invention provides a content delivery network routing method, system, and user terminal. The method includes: receiving, by a CDN routing device, a first service request sent by a user terminal, where the first service request carries a first uniform resource locator URL and a domain name; returning, by the CDN routing device, a redirection response message to the user terminal, where the redirection response message carries a second URL, and the domain name; and receiving, by the cache node, a second service request sent by the user terminal, and returning a header field indication to the user terminal. Therefore, when the user terminal accesses content accelerated by a CDN, the user terminal can obtain cookie information corresponding to a domain name, which is advantageous to network-side authentication and user login information management.

12 Claims, 7 Drawing Sheets

(51) Int. Cl.
*H04L 29/12* (2006.01)
*H04L 29/08* (2006.01)

(58) Field of Classification Search
CPC ... H04L 63/08; G06F 17/30902; G06F 9/5027
USPC .......................... 709/223, 238, 214; 370/230
See application file for complete search history.

(56) References Cited

U.S. PATENT DOCUMENTS

| | | | | |
|---|---|---|---|---|
| 7,908,649 | B1* | 3/2011 | Arora | G06F 17/30902 726/7 |
| 2002/0023159 | A1* | 2/2002 | Vange | G06F 9/5027 709/228 |
| 2002/0078233 | A1* | 6/2002 | Biliris | H04L 29/06 709/238 |
| 2005/0240940 | A1* | 10/2005 | Quinet | H04L 29/06 719/315 |
| 2009/0234965 | A1 | 9/2009 | Viveganandhan et al. | |
| 2010/0042743 | A1* | 2/2010 | Jeon | H04L 29/12066 709/238 |
| 2012/0198043 | A1* | 8/2012 | Hesketh | H04L 29/1265 709/223 |
| 2012/0255036 | A1* | 10/2012 | Kidder | H04L 63/08 726/29 |
| 2012/0272266 | A1 | 10/2012 | Ou et al. | |
| 2013/0124678 | A1 | 5/2013 | Yang et al. | |
| 2013/0132544 | A1* | 5/2013 | Krishnan | H04L 67/2814 709/223 |

FOREIGN PATENT DOCUMENTS

| | | |
|---|---|---|
| CN | 101610162 A | 12/2009 |
| CN | 102118401 A | 7/2011 |
| CN | 102143204 A | 8/2011 |
| CN | 102143212 A | 8/2011 |
| EP | 2355446 A2 | 8/2011 |

* cited by examiner

CONTENT DELIVERY NETWORK ROUTING METHOD, SYSTEM AND USER TERMINAL

This application is a continuation of International Application No. PCT/CN2011/083398, filed on Dec. 2, 2011, which is hereby incorporated by reference in its entirety.

TECHNICAL FIELD

The present invention relates to the IT field, and in particular, to a content delivery network (CDN) routing method, system, and user terminal.

BACKGROUND

A CDN is a new network architecture added to an existing internet protocol (IP) transmission network, where the network architecture mainly includes parts such as distributed storage, load balancing, network request redirection, and content management, while content management and global network traffic management are a core of the CDN. Specifically, the CDN publishes content of a website to a network "edge" proximate to a user, so that the user can obtain required content proximately by determining proximity and a server load. This solves the network congestion and low response speed problems that are caused by low network bandwidth, heavy user access traffic, and uneven node distribution when a user accesses the network.

Specifically, in the CDN, a service request of a user terminal may be routed by using a redirection routing manner (for example, Hyper Text Transfer Protocol (HTTP) redirection); the service request initiated by the user terminal is resolved by a domain name system (DNS) and routed to a CDN routing device; the CDN routing device may select, according to a geographic location of the terminal and content requested by the terminal, a proper cache node to provide content for the user terminal; the CDN routing device modifies a domain name in the received service request, constructs a new domain name, and redirects the user terminal to the selected cache node in the CDN by carrying the new constructed domain name in a returned redirection response message; because the new constructed domain name is carried when the user terminal sends the service request to the cache node, a limitation is caused to an application scenario where cookie information needs to be used to authenticate a terminal user or record user history access information.

SUMMARY OF THE INVENTION

Embodiments of the present invention provide a content delivery network routing method, system, and user terminal; therefore, in a redirection routing manner, when a user terminal initiates a service request to a redirected address, cookie information can still be carried in the service request to satisfy service applications requiring cookie information, for example, scenarios of performing authentication and recording history access information.

A CDN routing method provided by an embodiment of the present invention includes receiving, by a CDN routing device, a first service request sent by a user terminal, where the first service request carries a first uniform resource locator URL, where the first URL is an original URL requested by the user terminal, and a domain name corresponding to the first URL is an original domain name requested by the user terminal, returning, by the CDN routing device, a redirection response message to the user terminal, where the redirection response message carries a second URL, where a domain name corresponding to the second URL includes an identifier of a cache node selected by the CDN routing device for the user terminal, and the domain name corresponding to the second URL is a child domain name of the original domain name or is at a same level as the original domain name, and receiving, by the cache node, a second service request sent by the user terminal, where the second service request carries the second URL, and returning a header field indication to the user terminal, where the header field indication carries cookie information.

Another CDN routing method provided by an embodiment of the present invention includes receiving, by an upper-layer CDN routing device, a first service request sent by a user terminal, where the first service request carries a first uniform resource locator URL, where the first URL is an original URL requested by the user terminal, and a domain name corresponding to the first URL is an original domain name requested by the user terminal, returning, by the upper-layer CDN routing device, a redirection response message to the user terminal, where the redirection response message carries a third URL, where a domain name corresponding to the third URL includes an identifier of a lower-layer routing device, receiving, by the upper-layer CDN routing device, a domain name system DNS request initiated by the user terminal, where the DNS request carries the domain name corresponding to the third URL, returning, by the upper-layer CDN routing device, address information of the lower-layer CDN routing device to the user terminal according to the identifier of the lower-layer routing device that is included in the domain name corresponding to the third URL, receiving, by the lower-layer CDN routing device, a second service request sent by the user terminal, where the second service request carries the third URL, and returning a redirection response message to the user terminal, where the redirection response message carries a second URL, where a domain name corresponding to the second URL includes an identifier of a cache node selected by the lower-layer CDN routing device for the user terminal, and the domain name corresponding to the second URL is a child domain name of the original domain name or is at a same level as the original domain name, and receiving, by the cache node, a third service request sent by the user terminal, where the third service request carries the second URL, and returning a header field indication to the user terminal, where the header field indication carries cookie information.

Another CDN routing method provided by an embodiment of the present invention includes receiving, by a first lower-layer CDN routing device, a first service request sent by a user terminal, where the first service request carries a first uniform resource locator URL, where the first URL is an original URL requested by the user terminal, and a domain name corresponding to the first URL is an original domain name requested by the user terminal, returning, by the first lower-layer CDN routing device, a redirection response message to the user terminal, where the redirection response message carries a third URL, where a domain name corresponding to the third URL includes an identifier of a second lower-layer routing device, receiving, by an upper-layer CDN routing device, a DNS request initiated by the user terminal, where the DNS request carries the domain name corresponding to the third URL, and returning, by the upper-layer CDN routing device according to the identifier of the second lower-layer routing device that is included in the domain name corresponding to the third URL, address information of the second lower-layer CDN routing device to the user terminal, receiving, by the second lower-layer CDN routing device, a second service request sent by the user terminal, where the second service request carries the third URL, and returning a redirection response message to the user terminal, where the redirection response message carries a second URL, where a domain name corresponding to the second URL includes an identifier of a cache node selected by the second lower-layer CDN routing device for the user terminal, and the domain name corresponding to the second URL is a child domain name of the original domain name or is at a same level as the original domain name, and receiving, by the cache node, a third service request sent by the user terminal, where the third service request carries the second URL, and returning a header field indication to the user terminal, where the header field indication carries cookie information.

Another CDN routing method provided by an embodiment of the present invention includes sending, by a user terminal, a first service request to a CDN routing device, where the first service request carries a first uniform resource locator URL, where the first URL is an original URL requested by the user terminal, and a domain name corresponding to the first URL is an original domain name requested by the user terminal, receiving, by the user terminal, a redirection response message returned by the CDN routing device, where the redirection response message carries a second URL, where a domain name corresponding to the second URL includes an identifier of a cache node selected by the CDN routing device for the user terminal, and the domain name corresponding to the second URL is a child domain name of the original domain name or is at a same level as the original domain name. and sending, by the user terminal, a second service request to the selected cache node, where the second service request carries the second URL, and receiving a header field indication returned by the cache node, where the header field indication carries cookie information.

An embodiment of the present invention further provides a CDN routing system, including a CDN routing device configured to receive a first service request sent by a user terminal, wherein the first service request carries a first uniform resource locator (URL), wherein the first URL is an original URL requested by the user terminal, and a domain name corresponding to the first URL is an original domain name requested by the user terminal, and a cache node is configured to receive a second service request sent by the user terminal, wherein the second service request carries the second URL, and return a header field indication to the user terminal, wherein the header field indication carries cookie information. The CDN routing device is further configured to return a redirection response message to the user terminal, wherein the redirection response message carries a second URL, wherein a domain name corresponding to the second URL comprises an identifier of a cache node selected by the CDN routing device for the user terminal, and the domain name corresponding to the second URL is a child domain name of the original domain name or is at a same level as the original domain name.

An embodiment of the present invention further provides another CDN routing system, where the system includes an upper-layer CDN routing device, a lower-layer CDN routing device, and a cache node, where the upper-layer CDN routing device is configured to receive a first service request sent by a user terminal, where the first service request carries a first uniform resource locator URL, where the first URL is an original URL requested by the user terminal, and a domain name corresponding to the first URL is an original domain name requested by the user terminal, the upper-layer CDN routing device is further configured to return a redirection response message to the user terminal, where the redirection response message carries a third URL, where a domain name corresponding to the third URL includes an identifier of a lower-layer routing device, the upper-layer CDN routing device is further configured to receive a domain name system DNS request initiated by the user terminal, where the DNS request carries the domain name corresponding to the third URL, the upper-layer CDN routing device is further configured to return address information of the lower-layer CDN routing device to the user terminal according to the identifier of the lower-layer routing device that is included in the domain name corresponding to the third URL, the lower-layer CDN routing device is configured to receive a second service request sent by the user terminal, where the second service request carries the third URL, and return a redirection response message to the user terminal, where the redirection response message carries a second URL, where a domain name corresponding to the second URL includes an identifier of a cache node selected by the lower-layer CDN routing device for the user terminal, and the domain name corresponding to the second URL is a child domain name of the original domain name or is at a same level as the original domain name, and the cache node is configured to receive a third service request sent by the user terminal, where the third service request carries the second URL, and return a header field indication to the user terminal, where the header field indication carries cookie information.

An embodiment of the present invention further provides another CDN routing system, where the system includes an upper-layer CDN routing device, a first lower-layer CDN routing device, a second lower-layer CDN routing device, and a cache node, where the first lower-layer CDN routing device is configured to receive a first service request sent by a user terminal, where the first service request carries a first uniform resource locator URL, where the first URL is an original URL requested by the user terminal, and a domain name corresponding to the first URL is an original domain name requested by the user terminal, the first lower-layer CDN routing device is further configured to return a redirection response message to the user terminal, where the redirection response message carries a third URL, where a domain name corresponding to the third URL includes an identifier of a second lower-layer routing device, the upper-layer CDN routing device is configured to receive a domain name system DNS request initiated by the user terminal, where the DNS request carries the domain name corresponding to the third URL, and return, according to the identifier of the second lower-layer routing device that is included in the domain name corresponding to the third URL, address information of the second lower-layer CDN routing device to the user terminal, the second lower-layer CDN routing device is configured to receive a second service request sent by the user terminal, where the second service request carries the third URL, and return a redirection response message to the user terminal, where the redirection response message carries a second URL, where a domain name corresponding to the second URL includes an identifier of a cache node selected by the second lower-layer CDN routing device for the user terminal, and the domain name corresponding to the second URL is a child domain name of the original domain name or is at a same level as the original domain name, and the cache node is configured to receive a third service request sent by the user terminal, where the third service request carries the second URL, and return a header field indication to the user terminal, where the header field indication carries cookie information.

An embodiment of the present invention further provides a user terminal, including a sending unit, configured to send a first service request to a content delivery network CDN routing device, where the first service request carries a first uniform resource locator URL, where the first URL is an original URL requested by the user terminal, and a domain name corresponding to the first URL is an original domain name requested by the user terminal, and a receiving unit, configured to receive a redirection response message returned by the CDN routing device, where the redirection response message carries a second URL, where a domain name corresponding to the second URL includes an identifier of a cache node selected by the CDN routing device for the user terminal, and the domain name corresponding to the second URL is a child domain name of the original domain name or is at a same level as the original domain name. The sending unit is further configured to send a second service request to the selected cache node, where the second service request carries the second URL, and the receiving unit is further configured to receive a header field indication returned by the cache node, where the header field indication carries cookie information.

The embodiments of the present invention provide a content delivery network routing method, system, and user terminal. A second URL constructed by the CDN routing device and sent to the user terminal includes an identifier of a cache node selected for the user terminal, and a domain name corresponding to the second URL is a child domain name of the original domain name or is at a same level as the original domain name; and the user terminal obtains from the cache node a header field indication carrying cookie information. Therefore, the user terminal can carry the cookie information when subsequently accessing content of the original domain name, and a network side can authenticate the user terminal and manage history access information.

BRIEF DESCRIPTION OF THE DRAWINGS

To illustrate the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The technical problem is described by using an example: It is assumed that a uniform resource locator (URL) carried in a service request sent by a user terminal to a CDN routing device is http://www.cp1.com/news/a.html, where content corresponding to www.cp1.com is provided by a content provider (CP), and a content delivery acceleration service is provided through a CDN. The CDN routing device selects a cache node (an identifier of the cache node is C1) for the user terminal according to a preset policy, and constructs a new URL http://C1.cdn.net/www.cp1.com/news/a.html. When the user terminal sends a service request to a redirected address, because a domain name is changed to C1.cdn.net, the user terminal does not carry cookie information in the initiated service request with respect to the original domain name www.cp1.com; therefore, a limitation is caused to an application scenario where cookie information needs to be used to authenticate a terminal user or record user access history information.

A typical architecture of a CDN routing system may include the following parts:

a local DNS: which is generally a local DNS server of a network provider providing a broadband access service for a user terminal, or may be a public DNS server configured directly on a terminal, for example, a DNS server provided by Google;

a DNS authorized by a CP: a DNS server deployed by the CP and providing a DNS resolution service for a domain name published by the CP;

an origin server: a content origin server deployed by the CP, where, when the CP selects a CDN to provide a content delivery service, if the CDN does not locally cache content requested by the user terminal, the CDN requests content from the origin server;

a CDN routing device: responsible for completing service routing, that is, selecting, according to the geographic location of the terminal and content requested by the terminal, a proper cache node from the CDN to provide a content delivery service for the terminal; and a cache node: a cache node in the CDN, locally caching, according to popularity of the content, the content requested by the terminal, and providing content delivery for the terminal directly according to the locally cached content when receiving a service request of the terminal; if the content requested by the terminal is not cached locally, requesting the content from an upper-layer cache node in the CDN or the origin server of the CP before delivering the content to the terminal.

Note that, in embodiments of the present invention, the above parts are not necessarily required, and may be adjusted according to the change of the network architecture, for example, the content origin server may be optional in some scenarios.

Also note that, the content delivery network may be a network side exclusive of the user terminal in a broad sense, and in a narrow sense, may also be a network part including only a content acceleration function, for example, a CDN routing device and a cache node.

Figure 1:
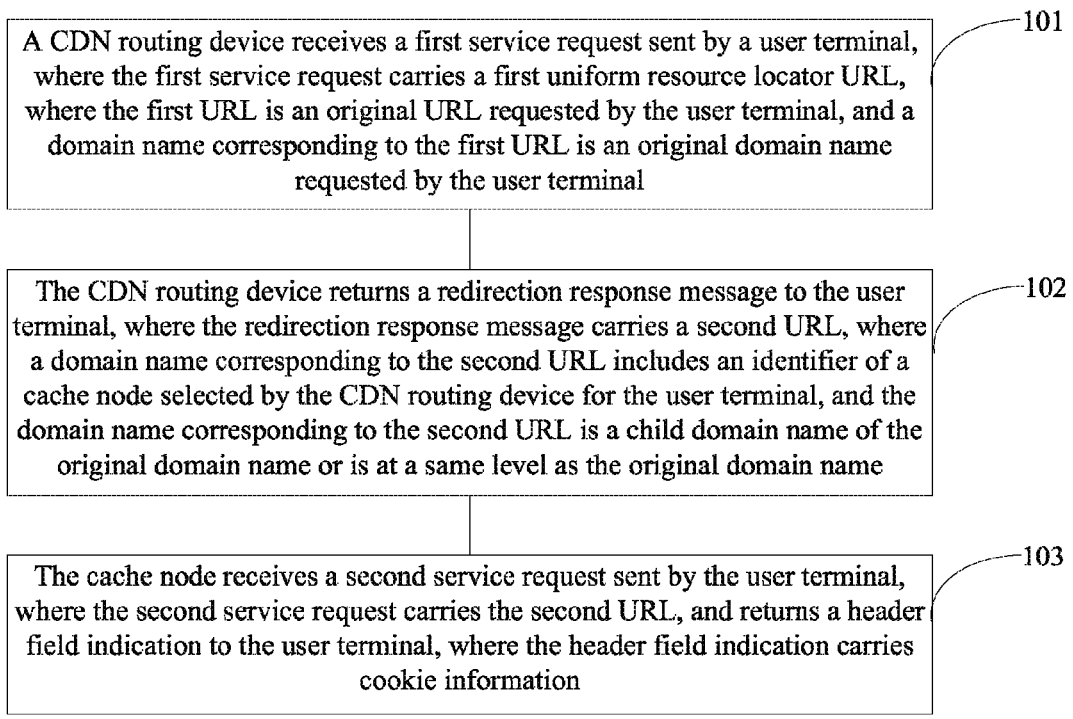
FIG. 1 is a schematic flowchart of a content delivery network routing method according to an embodiment of the present invention.

FIG. 1 shows a CDN routing method according to an embodiment of the present invention, including the following steps.

Step 101: A CDN routing device receives a first service request sent by a user terminal, where the first service request carries a first uniform resource locator URL, where the first URL is an original URL requested by the user terminal, and a domain name corresponding to the first URL is an original domain name requested by the user terminal.

Step 102: The CDN routing device returns a redirection response message to the user terminal, where the redirection response message carries a second URL, where a domain name corresponding to the second URL includes an identifier of a cache node selected by the CDN routing device for the user terminal, and the domain name corresponding to the second URL is a child domain name of the original domain name or is at a same level as the original domain name.

Step 103: The cache node receives a second service request sent by the user terminal, where the second service request carries the second URL, and returns a header field indication to the user terminal, where the header field indication carries cookie information.

It should be noted that, domain names at the same level have same levels and same parent domain names. For example, C1www.cp1.com and www.cp1.com are domain names at the same level, and their levels are both 3 and parent domain names are both .cp1.com.

Further, after the cache node receives the second service request sent by the user terminal, the method further includes: sending, by the cache node, a third service request to an origin server, and receiving a cookie header field returned by the origin server, where the cookie header field includes cookie information to be provided when the user terminal accesses the original domain name. The cookie header field further includes a domain name to which the cookie information is applied, where the domain name to which the cookie information is applied is the original domain name, a parent domain name of the original domain name, or a child domain name of the original domain name.

Before the cache node sends the third service request to the origin server, the method further includes: determining, by the cache node, whether content corresponding to the original URL is cached locally, and if yes, carrying, in the third service request sent to the origin server, a header field indication used to instruct the origin server to return the cookie header field set for the user terminal to the cache node without returning the content corresponding to the original URL.

When the cookie header field returned by the origin server does not include a domain name to which the cookie information is applied, the cache node adds the domain name to which the cookie information is applied, to the header field indication sent to the user terminal, where the domain name to which the cookie information is applied is the original domain name, a parent domain name of the original domain name, or a child domain name of the original domain name.

After the CDN routing device returns the redirection response message to the user terminal, and before the cache node receives the second service request sent by the user terminal, the method further includes: sending, by the CDN routing device, address information of the cache node selected for the user terminal to the user terminal.

Specifically, the sending, by the CDN routing device, address information of the cache node selected for the user terminal to the user terminal includes:

receiving, by a local domain name system DNS, a first DNS request sent by the user terminal, and forwarding the first DNS request to a DNS authorized by a content provider CP, where the first DNS request carries the domain name corresponding to the second URL;

determining, by the DNS authorized by the CP, according to subscription information, that content provided by the domain name corresponding to the second URL needs to be accelerated by a CDN, and redirecting the first DNS request to the CDN;

initiating, by the local DNS, a second DNS request to the CDN routing device, where the request carries the domain name corresponding to the second URL; and returning, by the CDN routing device, the address information of the cache node to the user terminal through the local DNS according to the identifier of the cache node that is included in the domain name corresponding to the second URL.

The DNS authorized by the CP may redirect the DNS request to the CDN in two manners, including:

redirecting, by the DNS authorized by the CP, the DNS request to the CDN in a manner of returning an NS (Name server, domain name server) record to the local DNS; or redirecting, by the DNS authorized by the CP, the DNS request to the CDN in a manner of returning a CNAME to the local DNS.

After the cache node receives the second service request sent by the user terminal, the method further includes removing, by the cache node, the identifier of the cache node in the second URL, and restoring the second URL to the original URL.

Before the CDN routing device returns the redirection response message to the user terminal, the method further includes determining, by the CDN routing device according to the original URL, content requested by the user terminal, and selecting: the cache node for the user terminal according to address information of the user terminal, the content requested by the user terminal, and a CDN routing rule.

Figure 2:
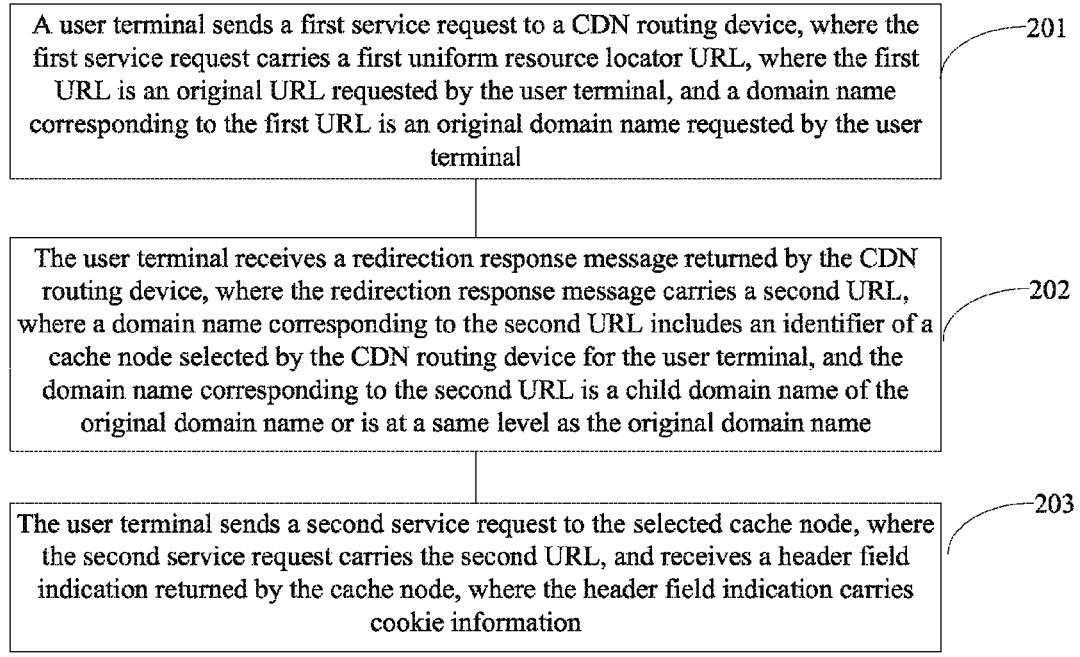
FIG. 2 is a schematic flowchart of another content delivery network routing method according to an embodiment of the present invention.

FIG. 2 shows another content delivery network CDN routing method according to an embodiment of the present invention, including the following steps.

Step 201: A user terminal sends a first service request to a CDN routing device, where the first service request carries a first uniform resource locator URL, where the first URL is an original URL requested by the user terminal, and a domain name corresponding to the first URL is an original domain name requested by the user terminal.

Step 202: The user terminal receives a redirection response message returned by the CDN routing device, where the redirection response message carries a second URL, where a domain name corresponding to the second URL includes an identifier of a cache node selected by the CDN routing device for the user terminal, and the domain name corresponding to the second URL is a child domain name of the original domain name or is at a same level as the original domain name.

Step 203: The user terminal sends a second service request to the selected cache node, where the second service request carries the second URL, and receives a header field indication returned by the cache node, where the header field indication carries cookie information.

The embodiment of the present invention provides a content delivery network routing method. A CDN routing device receives from a user terminal a first service request carrying a first URL; a constructed second URL sent to a user includes an identifier of a cache node selected for the user terminal, and a domain name corresponding to the second URL is a child domain name of the original domain name or is at a same level as the original domain name; and the user terminal obtains from the cache node a header field indication carrying cookie information. Therefore, the user terminal can carry the cookie information when subsequently accessing other content of the original domain name, and a network side can authenticate the user terminal and manage user login information.

Further, the header field indication further carries a domain name to which the cookie information is applied, where the domain name to which the cookie information is applied is the original domain name, a parent domain name of the original domain name, or a child domain name of the original domain name. Therefore, the user terminal can also carry corresponding cookie information when subsequently accessing content corresponding to the parent domain name or child domain name of the original domain name, and the network side can authenticate the user terminal and manage user login information.

Figure 3:
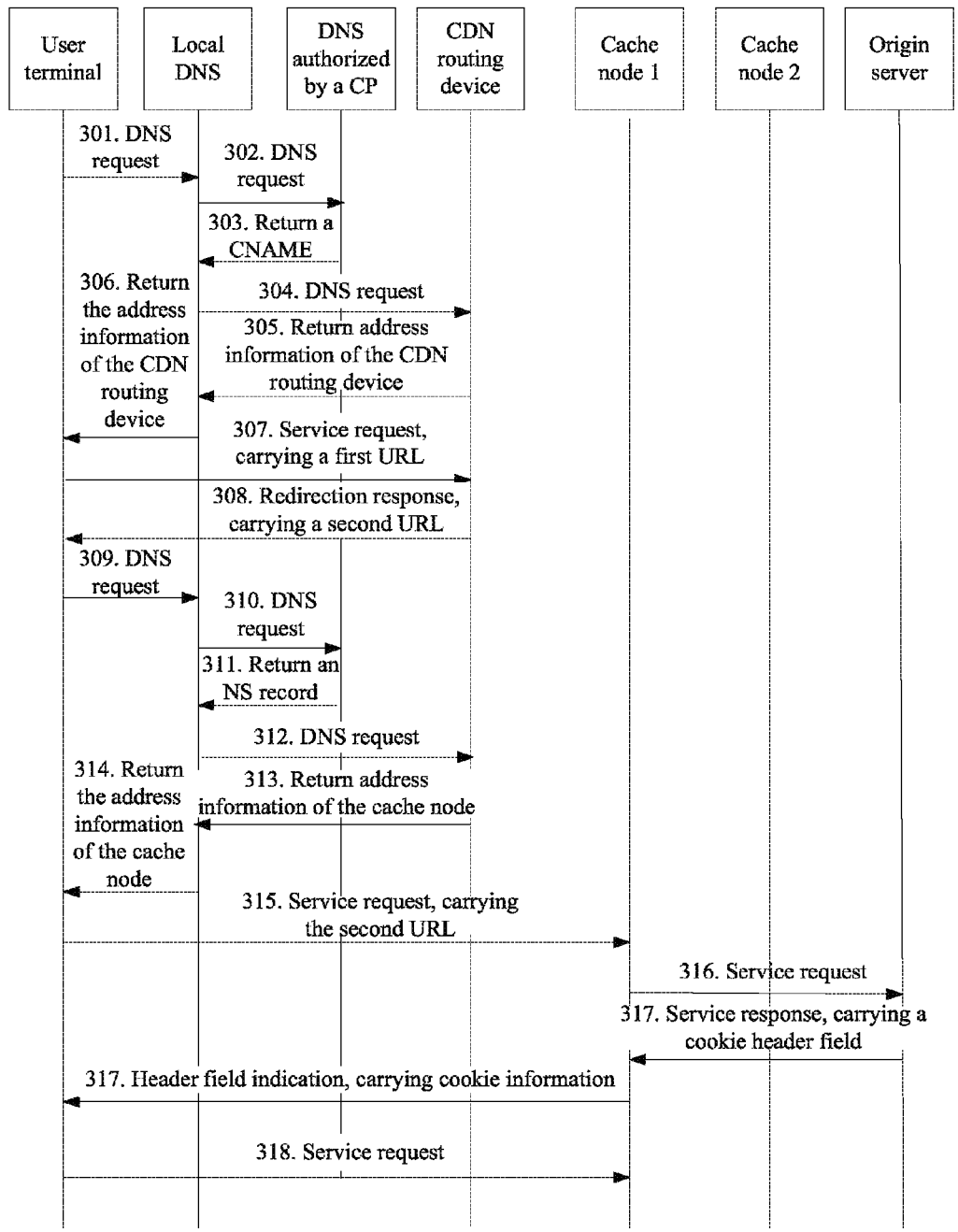
FIG. 3 is a schematic flowchart of another content delivery network routing method according to an embodiment of the present invention.

FIG. 3 shows a schematic flowchart of a content delivery network routing method according to an embodiment of the present invention. In a specific scenario, a CP 1 provides a content acceleration service by using a CDN, and requires the CDN to provide an acceleration service for content whose domain name is www.cp1.com (namely, an original domain name), where the specific routing method may include the following steps.

Step 301: A user terminal accesses service content that is provided by the CP 1 and accelerated by a CDN; the user terminal first initiates a DNS request to a local DNS, and obtains an IP address corresponding to the domain name (the domain name is an original domain name).

For example, if a URL to be accessed by the user terminal is http://www.cp1.com/news/a.html (marked as a first URL or an original URL), the user terminal first needs to obtain an IP address corresponding to the domain name www.cp1.com, and therefore, the terminal first initiates a DNS request for resolving www.cp1.com to the local DNS.

Step 302: After receiving the DNS request of the user terminal, the local DNS checks whether address information corresponding to the domain name is cached locally, and if the address information is not cached, initiates a DNS request with respect to the domain name to a DNS server authorized by a CP, or if the address information corresponding to the domain name is cached locally, directly executes step 306.

For example, if the local DNS finds that address information corresponding to the domain name www.cp1.com is not cached locally, the local DNS initiates a DNS resolution request for www.cp1.com to the DNS authorized by the CP.

Step 303: After receiving the DNS request sent by the local DNS, the DNS authorized by the CP determines that service content corresponding to the domain name carried in the DNS request needs to be accelerated by the CDN, and therefore directs the DNS request to the CDN, and specifically, may direct the DNS request to the CDN in a manner of returning a CNAME.

For example, if the DNS authorized by the CP finds, according to subscription information of the CDN, that service content of www.cp1.com needs to be accelerated by the CDN, the DNS authorized by the CP returns a CNAME to the local DNS, where the returned CNAME may be www.cp1.com.cdn.net, and therefore redirects the DNS request to the CDN. Note that, an existing manner may be used to redirect the DNS request to the CDN in a manner of returning a CNAME, which is not limited by the embodiment of the present invention.

Step 304: The local DNS uses the CNAME returned by the DNS authorized by the CP as a new domain name to initiate a DNS request to a CDN routing device (namely, a service router in a CDN). Note that the local DNS may use the CNAME as a domain name to obtain an address of the corresponding CDN routing device according to an existing domain name resolution manner.

Step 305: The CDN routing device receives the DNS request with respect to the new domain name, determines, according to subscription information, that it is necessary to provide an acceleration service for service content corresponding to a domain name requested by the user terminal, and returns address information of the CDN routing device to the local DNS. Note that the CDN routing device has not obtained an address of the user terminal and requested content at this time, and cannot accurately select a serving cache node for the user terminal.

For example, after receiving the request for resolving the domain name www.cp1.com.cdn.net, the service router determines, according to the subscription information, it is necessary to provide an acceleration service for www.cp1.com. The service router cannot accurately select a serving cache node for the user terminal and needs to return an IP address of the service router, because the service router has not obtained the specific address of the terminal and the content requested by the terminal at this time Step 306: After receiving the address information of the CDN routing device, the local DNS forwards the address information to the user terminal.

Step 307: After receiving the address information of the CDN routing device, the user terminal sends a service request to the CDN routing device, where the service request carries a first URL accessed by the user terminal.

For example, the user terminal initiates an HTTP service request to the service router according to the IP address of the service router, where a requested URL is http://www.cp1.com/news/a.html.

Step 308: The CDN routing device receives the service request sent by the user terminal, selects, according to address information of the user terminal, the content requested by the user terminal, and a CDN routing rule, a cache node for the user terminal, constructs, according to the selected cache node, a second URL including an identifier of the cache node, and returns a redirection response message carrying the second URL including the identifier of the cache node to the user terminal.

Specifically, the CDN routing device receives the HTTP service request initiated by the user terminal, obtains the address information of the user terminal, and obtains, according to the URL carried in the service request, content information requested by the terminal; the CDN routing device selects, based on the CDN routing rule, a proper cache node for the user terminal according to the address information of the user terminal and the requested content information. Specifically, a principle of a geographic location first or content first may be used. For the geographic location first, a cache node nearest to the geographic location of the user terminal is selected to provide a service for the user terminal; for the content first, a cache node caching the content requested by the terminal is selected to provide a service for the user terminal. After selecting the proper cache node, the CDN routing device constructs the second URL including the identifier of the cache node, where a domain name of the second URL is a child domain name of the original domain name. The CDN routing device carries the second URL in the redirection response message sent to the user terminal, and therefore redirects the user terminal to the selected cache node. The specific construction manner may be that: if the original domain name is www.cp1.com, and C1 is the identifier of the cache node selected by the CDN routing device for the user terminal, the format of the constructed second URL may be http://C1.www.cp1.com/news/a.html, where the domain name of the second URL is C1.www.cp1.com and is a child domain name of the original domain name. It should be noted that, the embodiment of the present invention does not limit the format of the second URL, where the second URL may also be defined in other forms as long as a function of identifying the cache node can be implemented.

Step 309: The user terminal receives the redirection response message, and initiates a DNS request to the local DNS, where the DNS request carries a domain name of the second URL and is used to obtain address information corresponding to the domain name, where the domain name of the second URL includes the identifier of the selected cache node.

Step 310: After receiving the DNS request sent by the user terminal, the local DNS determines whether the address information corresponding to the domain name is cached locally, and if not, initiates a DNS request with respect to the domain name to the DNS server authorized by the CP, or if the local DNS caches the address information corresponding to the domain name including the identifier of the cache node, directly executes step 314.

Step 311: The DNS authorized by the CP receives the DNS request initiated by the local DNS with respect to the domain name of the second URL, determines, according to the subscription information, that content corresponding to the domain name needs to be accelerated by the CDN, and redirects the DNS request to the CDN.

Manner 1: Redirect the DNS resolution request to the CDN in a manner of returning an name server (NS) record, where the NS record is used to indicate that all child domain names of the original domain name are resolved by the CDN routing device, and the format of the NS record may be *.original domain name NS domain name of the CDN routing device. For example, on the DNS authorized by the CP, configuration may be performed according to the following manner: *.www.cp1.com NS router.cdn.net, indicating that all child domain names of www.cp1.com are resolved by the domain name server router.cdn.net, where router.cdn.net corresponds to the CDN routing device.

Manner 2: Redirect the DNS request to the CDN in a manner of returning a canonical name (CNAME), where the returned CNAME may be: C1.www.cp1.com.cdn.net.

Step 312: After receiving the NS record or CNAME returned by the DNS authorized by the CP, the local DNS determines that the domain name of the second URL needs to be resolved by the CDN routing device, and initiates a DNS request to the CDN routing device, requesting to resolve the domain name of the second URL.

Note that the local DNS may record address information of the service router or the local DNS may find address information of the service router in the CDN in an iteration manner, which is not limited by the embodiment of the present invention.

Step 313: The CDN routing device returns address information of the cache node to the local DNS according to the identifier of the cache node that is included in the domain name of the second URL.

Specifically, after receiving the request for resolving the domain name C1.www.cp1.com, the service router in the CDN determines, according to the subscription information, that it is necessary to provide an acceleration service for www.cp1.com, and the domain name to be resolved includes the selected cache node C1 (corresponding to the cache node 1), and in this case, the service router may directly return an IP address of the node 1.

Step 314: After receiving the address information of the selected cache node that is returned by the CDN routing device, the local DNS sends the address information to the user terminal.

Step 315: The user terminal sends a service request to the cache node according to the address information of the selected cache node, where the URL carried in the request is the second URL.

Specifically, the user terminal initiates a service request to the cache node 1 according to the IP address of the cache node 1, where the requested URL is http://C1.www.cp1.com/news/a.html.

Step 316: The cache node initiates a service request to an origin server of the CP, requesting the content requested by the user terminal.

The cache node removes the identifier of the cache node in the second URL, restores the second URL to the original URL, and requests content corresponding to the original URL from the origin server. Specifically, after receiving an HTTP request message, the cache node 1 can restore the content http://www.cp1.com/news/a.html that is requested by the terminal.

Further, before the cache node initiates the service request to the origin server of the CP, the method further includes the following steps. The cache node determines whether the content corresponding to the original URL is cached locally, and if not, requests the content from the origin server of the CP (or requests the content from the origin server through an upper-level cache node in the CDN). If the content corresponding to the original URL is cached locally, the cache node checks, according to a configuration policy, whether the service request of the user terminal carries a cookie; if the service request does not carry a cookie, the cache node sends a request message to the origin server even if the cache node stores the content requested by the user terminal, and meanwhile carries indication information in the request message, where the indication information is used to instruct the origin server to return cookie information of the user terminal directly without carrying a message body, thereby reducing the data amount to be transmitted (for example, the indication information is an HTTP If-Modified-Since header field, and the origin server carries the cookie information of the user terminal in a returned Not-Modified message without carrying a message body).

Step 317: After receiving the service request sent by the cache node, the origin server returns a service response to the cache node, where the service response carries a cookie header field, where the cookie header field at least includes cookie information to be provided when the user terminal accesses the original domain name.

Specifically, an example of setting the cookie header field in the response message is as follows.

Manner 1: Set-Cookie: token=xyz; Path=/; Domain=www.cp1.com. Herein, a domain field indicates a domain name on which the cookie acts, that is, the terminal needs to carry cookie information of token=xyz when accessing the domain name, and if the domain field is not carried, the domain may be www.cp1.com by default.

Manner 2: Set-Cookie: token=xyz; Path=/; Domain=*.cp1.com. In manner 2, the domain field may be set to domain=*.cp1.com, that is, the domain field is set to a child domain name of the original domain name, and is used to indicate that the cookie information of token=xyz needs to be carried when the terminal accesses a child domain name of cp1.com.

Further, before the origin server returns the service response to the cache node, the following determining step may be further included.

The origin server determines whether the service request carries the cookie header field or whether the carried cookie header field satisfies a service requirement, and if not, the origin server sets cookie information in the service response message and returns the message to the cache node.

Note that the service requirement may be whether a time limit is satisfied, which is not limited by the embodiment of the present invention.

Step 318: The cache node receives the response message returned by the origin server, where the response message carries cookie information set by the origin server for the user terminal, and the cache node sends a header field indication to the user terminal according to the cookie information, where the header field indication includes a domain name and the cookie information set by the origin server for the user terminal, where the cookie information in the header field indication is applied to the domain name in the header field indication or a child domain name thereof.

Further, after receiving the response message from the origin server, the cache node may determine whether it is necessary to modify the cookie header field in the response message; when the cookie header field carried in the response message includes a domain name and the cookie information allocated by the origin server to the user terminal, the cache node may not modify the cookie header field, but directly use the cookie header field as the header field indication and send the header field indication to the user terminal; if the cookie header field carried in the response message does not carry a domain name, the cache node adds a domain name, and uses the cookie header field after the domain name is added as the header field indication and sends the header field indication to the user terminal.

The following describes the step according to two manners in detail: manner 1 corresponds to manner 1 in step 317; and manner 2 corresponds to manner 2 in step 318.

Manner 1: The format of the header field indication is as follows, Set-Cookie: token=xyz; Path=/; Domain=www.cp1.com.

Note that after the user terminal receives the header field indication, the user terminal carries the cookie information when subsequently accessing the domain name and a child domain name thereof. Specifically, the user terminal carries the cookie information token=xyz when the user terminal accesses www.cp1.com or a child domain of www.cp1.com. In another specific application scenario, a part of user terminals only support that the cookie information is carried with respect to the domain name included in the header field indication but the cookie information cannot be carried for a child domain name of the domain name. In this scenario, in the embodiment of the present invention, a child domain name record is further added to the header field indication, and used to instruct the user terminal to carry the cookie information with respect to a child domain name. Specifically, the format of the child domain name record may be: Set-Cookie token=xyz; Path=/; Domain=.www.cp1.com, and is used to instruct the user terminal to carry the cookie information of token=xyz when the user terminal accesses a child domain name of www.cp1.com.

Manner 2 (corresponding to manner 2 in step 317): the format of the header field indication is as follows: Set-Cookie: token=xyz; Path=/; Domain=*.cp1.com. After the user terminal receives the header field indication, the user terminal carries the cookie information when subsequently accessing a child domain name of cp1.com. *.cp1.com is a parent domain name of the original domain name.

Note that according to the description of step 315, the second URL carried when the user terminal sends the service request to the selected cache node is http://C1.www.cp1.com/news/a.html; in manner 2, domain=*.cp1.com is carried in the header field indication to the user terminal. However, for a part of user terminals, for security requirements, it is allowed to set the cookie information for only the domain name C1.www.cp1.com or child domain .www.cp1.com when those user terminals access the domain name C1.www.cp1.com, and setting cookie information for the child domain .cp1.com is not supported. For this part of user terminals, the embodiment of the present invention provides another domain name construction manner, which is used to enable the user terminals to set the cookie information for the child domain .cp1.com. The specific manner is as follows. In step 308, the second URL constructed by the CDN routing device for the user terminal is modified to http://C1www.cp1.com/news/a.html, and therefore C1www.cp1.com and www.cp1.com are domain names at the same level. In step 315, the service request sent by the user terminal to the selected cache node carries the second URL; domain=*.cp1.com carried in the header field indication received in step 318 can satisfy the security requirement of the user terminal.

In addition to the header field indication, a message body carried in a 200OK response message returned by the cache node to the user terminal may further include the content requested by the user terminal. Up to now, the user terminal has obtained the requested content, and obtained the cookie information to be carried when subsequently accessing the original domain name and a child domain name thereof again.

In another aspect, if the header field indication does not carry a domain name to which the cookie information is applied, the user terminal may consider that it is aimed at the original domain name by default. The domain name to which the cookie is applied, which is carried in the header field indication may be the original domain name, a parent domain name of the original domain name, or a child domain name of the original domain name. According to the description of manner 1 and manner 2, the domain name to which the cookie is applied may be reflected by the content of the domain name carried in the header field indication.

Step 319: When the user terminal accesses content corresponding to another URL of the original domain name, for example, http://www.cp1.com/news/b.html, by performing similar steps 301-314 above, the user terminal obtains address information of a cache node (assuming that the cache node selected by the CDN routing device is C2), and sends a service request to the cache node, where the service request carries a URL (http://C2.www.cp1.com/news/b.html) including an identifier of the C2; in this case, because a domain name corresponding to the URL is a child domain name of the original domain name, the user terminal carries the cookie information obtained in the preceding step in the service request.

The embodiment of the present invention provides a content delivery network routing method. A CDN routing device receives from a user terminal a first service request carrying a first URL; a constructed second URL sent to a user includes an identifier of a cache node selected for the user terminal, and a domain name corresponding to the second URL is a child domain name of the original domain name or is at a same level as the original domain name; and the user terminal obtains from the cache node a header field indication carrying cookie information. Therefore, the user terminal can carry the cookie information when subsequently accessing other content of the original domain name, and a network side can authenticate the user terminal and manage user login information.

Further, the header field indication further carries a domain name to which the cookie information is applied, where the domain name to which the cookie information is applied is the original domain name, a parent domain name of the original domain name, or a child domain name of the original domain name. Therefore, the user terminal can also carry corresponding cookie information when subsequently accessing content corresponding to the original domain name, or parent domain name or child domain name of the original domain name, and the network side can authenticate the user terminal and manage user login information.

For a large CDN, CDN routing devices may be deployed at multiple layers, and for simplicity of description, the embodiment of the present invention uses two layers as an example, where an upper-layer CDN routing device is responsible for selecting a lower-layer CDN routing device, and the lower-layer CDN routing device is responsible for completing service routing and selecting a proper cache node from the CDN to provide a content delivery service for a terminal. In practice, generally multiple lower-layer CDN routing devices are deployed and are responsible for different areas respectively. In the embodiment of the present invention, the upper-layer CDN routing device is marked as a Service Router H1, and the lower-layer CDN routing devices are marked as a Service Router L1 and Service Router L2 (the embodiment of the present invention uses one upper-layer CDN routing device and at least one lower-layer CDN routing device as an example for description).

The upper-layer CDN routing device receives a first service request sent by a user terminal, where the first service request carries a first uniform resource locator URL, where the first URL is an original URL requested by the user terminal, and a domain name corresponding to the first URL is an original domain name requested by the user terminal;

the upper-layer CDN routing device returns a redirection response message to the user terminal, where the redirection response message carries a third URL, where a domain name corresponding to the third URL includes an identifier of a lower-layer routing device;

the upper-layer CDN routing device receives a domain name system DNS request initiated by the user terminal, where the DNS request carries the domain name corresponding to the third URL;

the upper-layer CDN routing device returns address information of the lower-layer CDN routing device to the user terminal according to the identifier of the lower-layer routing device that is included in the domain name corresponding to the third URL;

the lower-layer CDN routing device receives a second service request sent by the user terminal, where the second service request carries the third URL, and returns a redirection response message to the user terminal, where the redirection response message carries a second URL, where a domain name corresponding to the second URL includes an identifier of a cache node selected by the lower-layer CDN routing device for the user terminal, and the domain name corresponding to the second URL is a child domain name of the original domain name or is at a same level as the original domain name; and the cache node receives a third service request sent by the user terminal, where the third service request carries the second URL, and returns a header field indication to the user terminal, where the header field indication carries cookie information.

Figure 4:
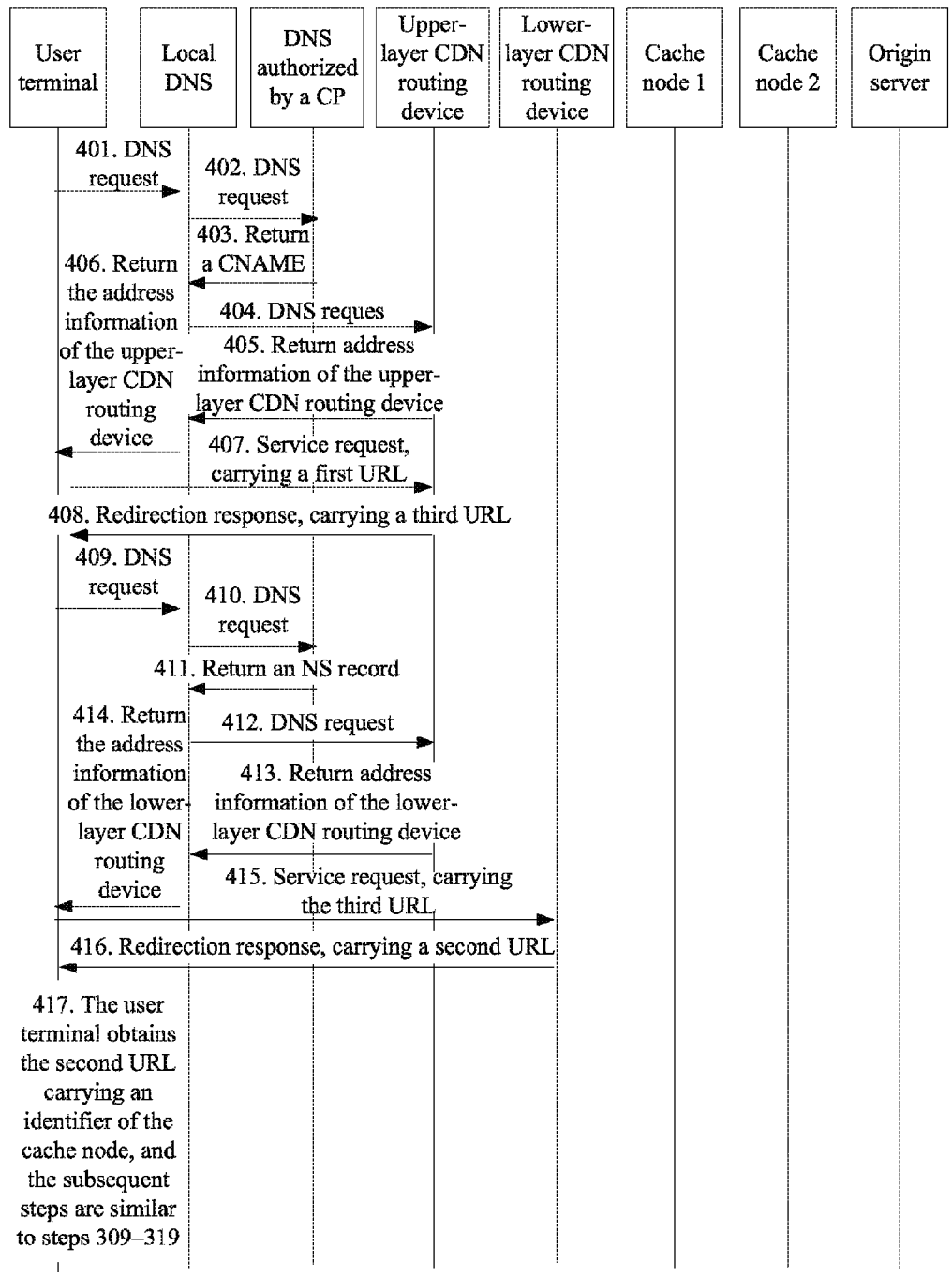
FIG. 4 is a schematic flowchart of another content delivery network routing method according to an embodiment of the present invention.

In a specific application scenario, the routing manner of multi-layer CDN routing devices is shown in FIG. 4, which is a schematic flowchart of another content delivery network routing method according to an embodiment of the present invention, where the method includes the following steps.

Steps 401-407 are similar to steps 301-307, and will not be further described herein. Note that the upper-layer CDN routing device in the embodiment of the present invention corresponds to the CDN routing device in the preceding embodiment.

Step 408: The upper-layer CDN routing device receives the service request sent by the user terminal, where the service request carries the first URL; the upper-layer CDN routing device allocates, according to address information of the user terminal, a lower-layer CDN routing device responsible for the area to the user terminal, constructs, according to the allocated lower-layer routing device, a third URL including an identifier of the lower-layer routing device, and returns the third URL to the user terminal.

For example, the service router H1 allocates the service router L1 to the user terminal according to an address of the user terminal, where an identifier of the service router L1 is L1; the format of the third URL constructed by the service router H1 may be: http://L1.www.cp1.com/news/a.html.

Steps 409-414 are similar to steps 309-314, all of which are obtaining address information of a domain name corresponding to the third URL. The difference lies in that, in step 314 of the preceding embodiment, the address information of the cache node selected by the CDN routing device for the user terminal is obtained, while in step 414 of this embodiment, address information of the lower-layer CDN routing device selected by the upper-layer CDN routing device for the user terminal is obtained.

Step 415: The user terminal obtains the address information of the lower-layer routing device, and sends a service request to the lower-layer routing device, where the service request carries the third URL.

Step 416: The lower-layer CDN routing device receives the service request sent by the user terminal, selects, according to the address information of the user terminal and the requested content, a cache node for the user terminal, constructs, according to the selected cache node, a second URL including an identifier of the cache node, and returns a redirection response message carrying the second URL including the identifier of the cache node to the user terminal.

For example, if C1 is the identifier of the cache node selected by the lower-layer CDN routing device for the user terminal, the format of the constructed second URL may be http://C1.www.cp1.com/news/a.html.

Note that, similar to step 308, in step 416, the user terminal obtains a URL including the identifier of the cache node. For steps after step 416, reference may be made to the execution manner after step 308 in the preceding embodiment, which will not be further described in the present invention.

Note that in the embodiment of the present invention, the service router H1 completes redirection processing for the first time; considering that in an actual application, the service router H1 may be an entry of a whole CDN service, the service load of the service router H1 needs to be reduced; therefore, redirection processing may be distributed to lower-layer service routers. Another content delivery network CDN routing method provided by an embodiment of the present invention includes:

receiving, by a first lower-layer CDN routing device, a first service request sent by a user terminal, where the first service request carries a first uniform resource locator URL, where the first URL is an original URL requested by the user terminal, and a domain name corresponding to the first URL is an original domain name requested by the user terminal;

returning, by the first lower-layer CDN routing device, a redirection response message to the user terminal, where the redirection response message carries a third URL, where a domain name corresponding to the third URL includes an identifier of a second lower-layer routing device;

receiving, by an upper-layer CDN routing device, a DNS request initiated by the user terminal, where the DNS request carries the domain name corresponding to the third URL, and returning, by the upper-layer CDN routing device according to the identifier of the second lower-layer routing device that is included in the domain name corresponding to the third URL, address information of the second lower-layer CDN routing device to the user terminal;

receiving, by the second lower-layer CDN routing device, a second service request sent by the user terminal, where the second service request carries the third URL, and returning a redirection response message to the user terminal, where the redirection response message carries a second URL, where a domain name corresponding to the second URL includes an identifier of a cache node selected by the second lower-layer CDN routing device for the user terminal, and the domain name corresponding to the second URL is a child domain name of the original domain name or is at a same level as the original domain name; and receiving, by the cache node, a third service request sent by the user terminal, where the third service request carries the second URL, and returning a header field indication to the user terminal, where the header field indication carries cookie information.

Figure 5:
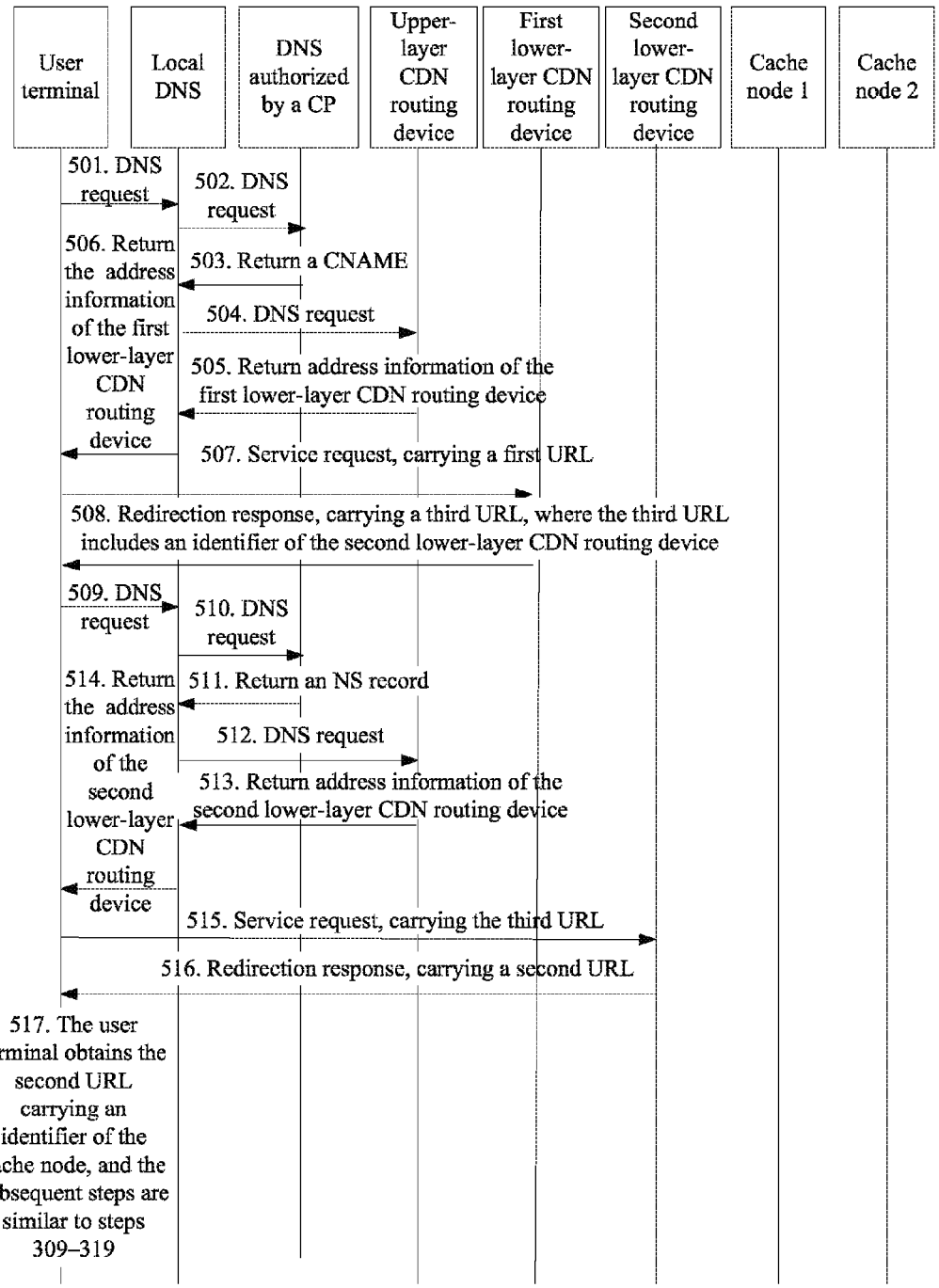
FIG. 5 is a schematic flowchart of another content delivery network routing method according to an embodiment of the present invention.

In a specific application scenario, redirection routing is completed by a lower-layer CDN routing device, and FIG. 5 shows a schematic flowchart of another content delivery network routing method according to an embodiment of the present invention.

Steps 501-506 are similar to steps 401-406, and the only difference lies in that, address information returned to the user terminal in steps 505 and 506 is address information of a first lower-layer CDN routing device. The first lower-layer CDN routing device is selected by an upper-layer CDN routing device according to address information of a local DNS and load information of the lower-layer CDN routing device.

Step 507: The user terminal sends a service request to the first lower-layer CDN routing device, where the request carries a first URL.

Step 508: After receiving the service request initiated by the user terminal, the first lower-layer CDN routing device redirects, according to location information of the user terminal, the user terminal to a second lower-layer CDN routing device responsible for a corresponding service area, and the first lower-layer CDN routing device constructs a third URL including an identifier of the second lower-layer CDN routing device, and returns the third URL to the user terminal. For example, if the identifier of the second lower-layer CDN routing device is L2, the format of the third URL constructed by the first lower-layer CDN routing device may be: http://L2.www.cp1.com/news/a.html.

Execution manners after step 509 are consistent with the execution manners after step 409, and will not be further described in the embodiment of the present invention.

Note that, for ease of description, an original URL requested by the user terminal is defined as a first URL, a URL that is constructed by the CDN routing device and includes the identifier of the cache node selected for the user terminal is defined as a second URL, and a URL including the identifier of the lower-layer CDN routing device selected for the user terminal is defined as a third URL.

Note that, in the embodiment of the present invention, redirection routing may be executed for multiple times until a most proper cache node is found.

In the embodiments corresponding to FIG. 4 and FIG. 5, manners of constructing content such as the domain name, URL, and cookie header field may all be the manners in the embodiment corresponding to FIG. 3.

Note that the CDN routing devices in the drawing of this embodiment may be deployed at multiple layers, that is, the first lower-layer CDN routing device and the second lower-layer CDN routing device may be CDN routing devices at different layers in the same CDN, or may also belong to different CDNs. Based on the same mechanism, multiple independent CDN systems may work jointly. In this case, the upper-layer CDN routing device, first lower-layer CDN routing device, and second lower-layer CDN routing device may be routing devices of multiple interworking CDN systems.

Corresponding to the foregoing method embodiment, an embodiment of the present invention further provides a CDN routing system and a user terminal.

Figure 6:
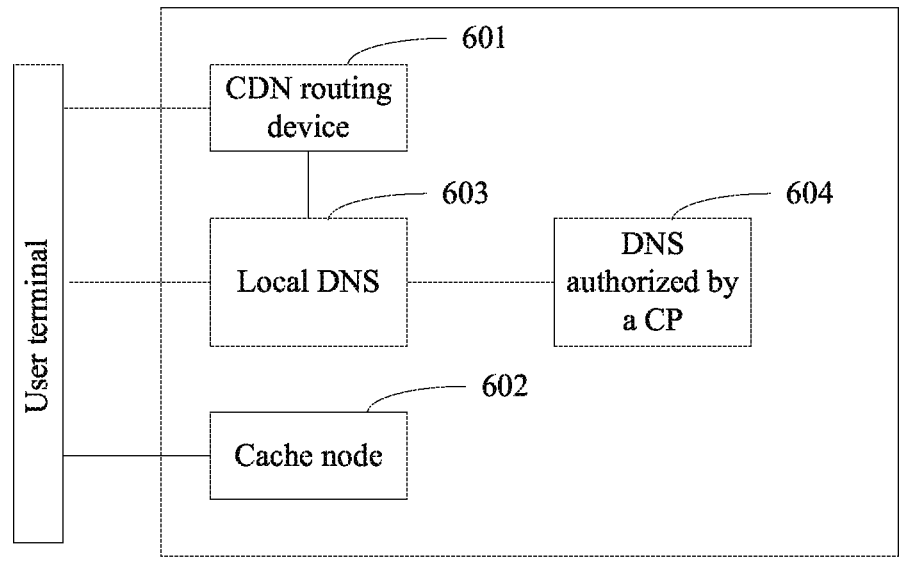
FIG. 6 is a schematic architecture diagram of a content delivery network routing system according to an embodiment of the present invention.

FIG. 6 shows a content delivery network CDN routing system according to an embodiment of the present invention, including a CDN routing device 601 and a cache node 602, where:

the CDN routing device 601 is configured to receive a first service request sent by a user terminal, where the first service request carries a first uniform resource locator URL, where the first URL is an original URL requested by the user terminal, and a domain name corresponding to the first URL is an original domain name requested by the user terminal;

the CDN routing device 601 is further configured to return a redirection response message to the user terminal, where the redirection response message carries a second URL, where a domain name corresponding to the second URL includes an identifier of a cache node selected by the CDN routing device for the user terminal, and the domain name corresponding to the second URL is a child domain name of the original domain name or is at a same level as the original domain name; and the cache node 602 is configured to receive a second service request sent by the user terminal, where the second service request carries the second URL, and return a header field indication to the user terminal, where the header field indication carries cookie information.

The cache node 602 is further configured to send a third service request to an origin server after receiving the second service request sent by the user terminal, and receive a cookie header field returned by the origin server, where the cookie header field includes cookie information to be provided when the user terminal accesses the original domain name.

The cache node 602 is further configured to determine, before sending the third service request to the origin server, whether content corresponding to the original URL is cached locally, and if yes, carry, in the third service request sent to the origin server, a header field indication used to instruct the origin server to return the cookie header field set for the user terminal to the cache node without returning the content corresponding to the original URL.

When the cookie header field returned by the origin server does not include a domain name to which the cookie information is applied, the cache node 602 is further configured to add the domain name to which the cookie information is applied, to the header field indication sent to the user terminal, where the domain name to which the cookie information is applied is the original domain name, a parent domain name of the original domain name, or a child domain name of the original domain name.

The CDN routing device 601 is further configured to send address information of the cache node selected for the user terminal to the user terminal.

Further, the system includes a local domain name system DNS 603 and a DNS 604 authorized by a content provider CP, where:

the local DNS 603 is configured to receive a first DNS request sent by the user terminal, and forward the first DNS request to the DNS authorized by the CP, where the first DNS request carries the domain name corresponding to the second URL;

the DNS 604 authorized by the CP determines, according to subscription information, that content provided by the domain name corresponding to the second URL needs to be accelerated by a CDN, and redirects the first DNS request to the CDN;

the local DNS 603 is further configured to initiate a second DNS request to the CDN routing device 601, where the request carries the domain name corresponding to the second URL; and the CDN routing device 601 is specifically configured to return the address information of the cache node to the user terminal through the local DNS according to the identifier of the cache node that is included in the domain name corresponding to the second URL.

The DNS 604 authorized by the CP is specifically configured to redirect the DNS request to the CDN in a manner of returning a domain name server NS record to the local DNS; or the DNS 604 authorized by the CP is specifically configured to redirect the DNS request to the CDN in a manner of returning a CNAME to the local DNS.

The cache node 602 is further configured to remove the identifier of the cache node in the second URL after receiving the second service request sent by the user terminal, and restore the second URL to the original URL.

The CDN routing device 601 is further configured to determine, according to the original URL, content requested by the user terminal, and select the cache node for the user terminal according to address information of the user terminal, the content requested by the user terminal, and a CDN routing rule.

Figure 7:
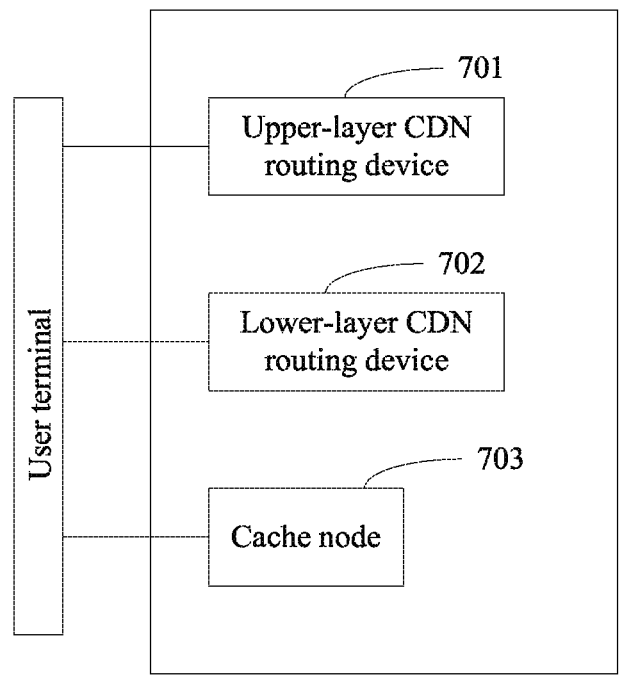
FIG. 7 is a schematic architecture diagram of another content delivery network routing system according to an embodiment of the present invention.

As shown in FIG. 7, corresponding to the method embodiment corresponding to FIG. 4, an embodiment of the present invention further provides a content delivery network CDN routing system, including: an upper-layer CDN routing device 701, a lower-layer CDN routing device 702, and a cache node 703, where:

the upper-layer CDN routing device 701 is configured to receive a first service request sent by a user terminal, where the first service request carries a first uniform resource locator URL, where the first URL is an original URL requested by the user terminal, and a domain name corresponding to the first URL is an original domain name requested by the user terminal;

the upper-layer CDN routing device 701 is further configured to return a redirection response message to the user terminal, where the redirection response message carries a third URL, where a domain name corresponding to the third URL includes an identifier of a lower-layer routing device;

the upper-layer CDN routing device 701 is further configured to receive a domain name system DNS request initiated by the user terminal, where the DNS request carries the domain name corresponding to the third URL;

the upper-layer CDN routing device 701 is further configured to return address information of the lower-layer CDN routing device to the user terminal according to the identifier of the lower-layer routing device that is included in the domain name corresponding to the third URL;

the lower-layer CDN routing device 702 is configured to receive a second service request sent by the user terminal, where the second service request carries the third URL, and return a redirection response message to the user terminal, where the redirection response message carries a second URL, where a domain name corresponding to the second URL includes an identifier of a cache node selected by the lower-layer CDN routing device for the user terminal, and the domain name corresponding to the second URL is a child domain name of the original domain name or is at a same level as the original domain name; and the cache node 703 is configured to receive a third service request sent by the user terminal, where the third service request carries the second URL, and return a header field indication to the user terminal, where the header field indication carries cookie information.

Figure 8:
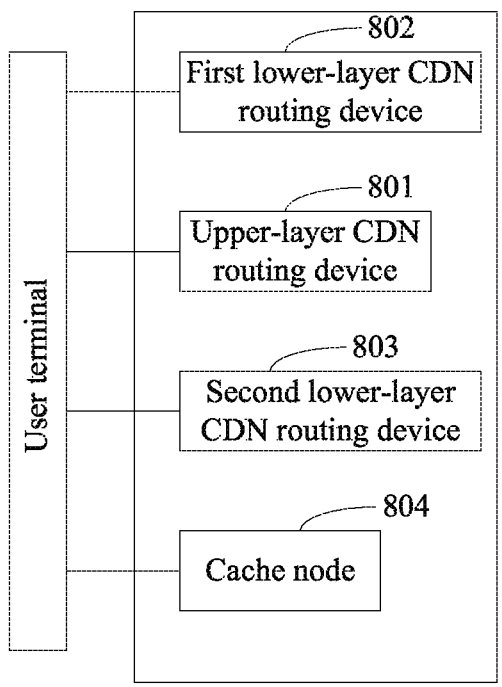
FIG. 8 is a schematic architecture diagram of another content delivery network routing system according to an embodiment of the present invention.

As shown in FIG. 8, corresponding to the method embodiment corresponding to FIG. 5, an embodiment of the present invention further provides a content delivery network CDN routing system, including: an upper-layer CDN routing device 801, a first lower-layer CDN routing device 802, a second lower-layer CDN routing device 803, and a cache node 804, where:

the first lower-layer CDN routing device 802 is configured to receive a first service request sent by a user terminal, where the first service request carries a first uniform resource locator URL, where the first URL is an original URL requested by the user terminal, and a domain name corresponding to the first URL is an original domain name requested by the user terminal;

the first lower-layer CDN routing device 802 is further configured to return a redirection response message to the user terminal, where the redirection response message carries a third URL, where a domain name corresponding to the third URL includes an identifier of a second lower-layer routing device;

the upper-layer CDN routing device 801 is configured to receive a domain name system DNS request initiated by the user terminal, where the DNS request carries the domain name corresponding to the third URL, and return, according to the identifier of the second lower-layer routing device that is included in the domain name corresponding to the third URL, address information of the second lower-layer CDN routing device to the user terminal;

the second lower-layer CDN routing device 803 is configured to receive a second service request sent by the user terminal, where the second service request carries the third URL, and return a redirection response message to the user terminal, where the redirection response message carries a second URL, where a domain name corresponding to the second URL includes an identifier of a cache node selected by the second lower-layer CDN routing device for the user terminal, and the domain name corresponding to the second URL is a child domain name of the original domain name or is at a same level as the original domain name; and the cache node 804 is configured to receive a third service request sent by the user terminal, where the third service request carries the second URL, and return a header field indication to the user terminal, where the header field indication carries cookie information.

Figure 9:
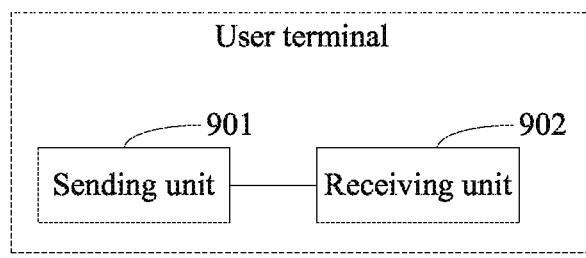
FIG. 9 is a schematic structural diagram of a user terminal according to an embodiment of the present invention.

FIG. 9 shows a user terminal according to an embodiment of the present invention, including:

a sending unit 901, configured to send a first service request to a content delivery network CDN routing device, where the first service request carries a first uniform resource locator URL, where the first URL is an original URL requested by the user terminal, and a domain name corresponding to the first URL is an original domain name requested by the user terminal; and a receiving unit 902, configured to receive a redirection response message returned by the CDN routing device, where the redirection response message carries a second URL, where a domain name corresponding to the second URL includes an identifier of a cache node selected by the CDN routing device for the user terminal, and the domain name corresponding to the second URL is a child domain name of the original domain name or is at a same level as the original domain name; where the sending unit 901 is further configured to send a second service request to the selected cache node, where the second service request carries the second URL; and the receiving unit 902 is further configured to receive a header field indication returned by the cache node, where the header field indication carries cookie information.

The receiving unit 902 is further configured to obtain address information of the cache node from the CDN routing device.

The sending unit 901 is further configured to initiate a third service request after the receiving unit 902 receives the header field indication returned by the cache node, where when content requested by the third service request is content corresponding to the original domain name, a parent domain name of the original domain name, or a child domain name of the original domain name, the third service request carries the cookie information.

The embodiments of the present invention provide a content delivery network routing system and user terminal. A CDN routing device receives a first service request that is sent by a user terminal and carries a first URL, and a constructed second URL sent to a user includes an identifier of a cache node selected for the user terminal, and a domain name corresponding to the second URL is a child domain name of the original domain name or is at a same level as the original domain name; and the user terminal obtains from the cache node a header field indication carrying cookie information. Therefore, the user terminal can carry the cookie information when subsequently accessing other content of the original domain name, and a network side can authenticate the user terminal and manage user login information.

Further, the header field indication further carries a domain name to which the cookie information is applied, where the domain name to which the cookie information is applied is the original domain name, a parent domain name of the original domain name, or a child domain name of the original domain name. Therefore, the user terminal can also carry corresponding cookie information when subsequently accessing content corresponding to the original domain name, or parent domain name or child domain name of the original domain name, and the network side can authenticate the user terminal and manage user login information.

It is clear to a person skilled in the art that, the present invention may be accomplished through software plus a necessary universal hardware platform. Based on such an understanding, the technical solutions of the present invention essentially, or the part contributing to the prior art may be implemented in the form of a software product. The computer software product may be stored in a storage medium, such as a ROM/RAM, a magnetic disk, or an optical disk, and include several instructions for instructing a computer device (which may be a personal computer, a server, a network device, or the like) to perform each embodiment of the present invention or the methods described in some parts of the embodiments.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A content delivery network (CDN) routing method, comprising:

receiving, by a CDN routing device, a first service request sent by a user terminal, wherein the first service request carries a first uniform resource locator (URL), wherein the first URL is an original URL requested by the user terminal, and a domain name corresponding to the first URL is an original domain name requested by the user terminal;

returning, by the CDN routing device, a redirection response message to the user terminal, wherein the redirection response message carries a second URL, wherein a domain name corresponding to the second URL comprises an identifier of a cache node selected by the CDN routing device for the user terminal, and the domain name corresponding to the second URL is a child domain name of the original domain name or is at a same level as the original domain name;

receiving, by the cache node, a second service request sent by the user terminal, wherein the second service request carries the second URL;

sending, by the cache node, a third service request to an origin server, and receiving a cookie header field returned by the origin server, wherein the cookie header field comprises cookie information to be provided when the user terminal accesses the original domain name; and returning, by the cache node, a header field indication to the user terminal, wherein the header field indication carries the cookie information.

2. The method according to claim 1, wherein when the cookie header field further comprises a domain name to which the cookie information is applied, the domain name is the original domain name, a parent domain name of the original domain name, or a child domain name of the original domain name; and when the cookie header field does not comprise a domain name to which the cookie information is applied, the method further comprises adding, by the cache node, the domain name to which the cookie information is applied, to the header field indication sent to the user terminal, wherein the domain name to which the cookie information is applied is the original domain name, a parent domain name of the original domain name, or a child domain name of the original domain name.

3. The method according to claim 1, wherein before the sending, by the cache node, a third service request to an origin server, the method further comprises determining, by the cache node, whether content corresponding to the original URL is cached locally, and, when the content corresponding to the original URL is cached locally, carrying, in the third service request sent to the origin server, a header field indication used to instruct the origin server to return the cookie header field set for the user terminal to the cache node without returning the content corresponding to the original URL.

4. The method according to claim 1, wherein after the returning, by the CDN routing device, a redirection response message to the user terminal and before the receiving, by the cache node, a second service request sent by the user terminal, the method further comprises:
    sending, by the CDN routing device, address information of the cache node selected for the user terminal to the user terminal;
    wherein the sending, by the CDN routing device, address information of the cache node selected for the user terminal to the user terminal comprises:
    receiving, by a local domain name system (DNS), a first DNS request sent by the user terminal, and forwarding the first DNS request to a DNS authorized by a content provider (CP), wherein the first DNS request carries the domain name corresponding to the second URL;
    determining, by the DNS authorized by the CP, according to subscription information, that content provided by the domain name corresponding to the second URL needs to be accelerated by a CDN, and redirecting the first DNS request to the CDN;
    initiating, by the local DNS, a second DNS request to the CDN routing device, wherein the second DNS request carries the domain name corresponding to the second URL; and
    returning, by the CDN routing device, the address information of the cache node to the user terminal through the local DNS according to the identifier of the cache node that is comprised in the domain name corresponding to the second URL.

5. The method according to claim 4, wherein the redirecting, by the DNS authorized by the CP, the first DNS request to the CDN comprises:
    redirecting, by the DNS authorized by the CP, the first DNS request to the CDN in a manner of returning a domain name server (NS) record to the local DNS; or
    redirecting, by the DNS authorized by the CP, the first DNS request to the CDN in a manner of returning a canonical name (CNAME) to the local DNS.

6. The method according to claim 1, wherein after the receiving, by the cache node, a second service request sent by the user terminal, the method further comprises:
    removing, by the cache node, the identifier of the cache node in the second URL, and restoring the second URL to the original URL.

7. The method according to claim 6, wherein before the returning, by the CDN routing device, a redirection response message to the user terminal, the method further comprises:
    determining, by the CDN routing device according to the original URL, content requested by the user terminal, and selecting the cache node for the user terminal according to address information of the user terminal, the content requested by the user terminal, and a CDN routing rule.

8. A content delivery network (CDN) routing system, wherein the system comprises:
    service router configured to receive a first service request sent by a user terminal, wherein the first service request carries a first uniform resource locator (URL), wherein the first URL is an original URL requested by the user terminal, and a domain name corresponding to the first URL is an original domain name requested by the user terminal; and
    a cache node is configured to receive a second service request sent by the user terminal, wherein the second service request carries a second URL, send a third service request to an origin server after receiving the second service request sent by the user terminal, and receive a cookie header field returned by the origin server, wherein the cookie header field comprises cookie information to be provided when the user terminal accesses the original domain name, and return a header field indication to the user terminal, wherein the header field indication carries the cookie information,
    wherein the service router is further configured to return a redirection response message to the user terminal, wherein the redirection response message carries the second URL, wherein a domain name corresponding to the second URL comprises an identifier of a cache node selected by the service router for the user terminal, and the domain name corresponding to the second URL is a child domain name of the original domain name or is at a same level as the original domain name.

9. The system according to claim 8, wherein:
    the cache node is further configured to determine, before sending the third service request to the origin server, whether content corresponding to the original URL is cached locally, and, when the content corresponding to the original URL is cached locally, carry, in the third service request sent to the origin server, a header field indication used to instruct the origin server to return the cookie header field set for the user terminal to the cache node without returning the content corresponding to the original URL.

10. The system according to claim 8, wherein: the service router is further configured to send address information of the cache node selected for the user terminal to the user terminal.

11. The system according to claim 10, wherein the system further comprises:
    a DNS authorized by a content provider (CP) configured to determine, according to subscription information, that content provided by the domain name corresponding to the second URL needs to be accelerated by a service router, and redirect a first DNS request to the service router;
    a local domain name system (DNS) configured to:
        receive the first DNS request sent by the user terminal, and forward the first DNS request to the DNS authorized by the CP, wherein the first DNS request carries the domain name corresponding to the second URL,
        initiate a second DNS request to the service router, wherein the second DNS request carries the domain name corresponding to the second URL; and
    the service router is further configured to return the address information of the cache node to the user terminal through the local DNS according to the identifier of the cache node that is comprised in the domain name corresponding to the second URL,
   wherein the DNS authorized by the CP is specifically configured to redirect the second DNS request to the service router in a manner of returning a domain name server (NS) record to the local DNS or returning a CNAME to the local DNS.

12. The system according to claim 8, wherein:
the cache node is further configured to remove the identifier of the cache node in the second URL after receiving the second service request sent by the user terminal, and restore the second URL to the original URL; and
the service router is further configured to determine, according to the original URL, content requested by the user terminal, and select the cache node for the user terminal according to address information of the user terminal, the content requested by the user terminal, and a service router routing rule.

* * * * *